United States Patent Office 3,810,937
Patented May 14, 1974

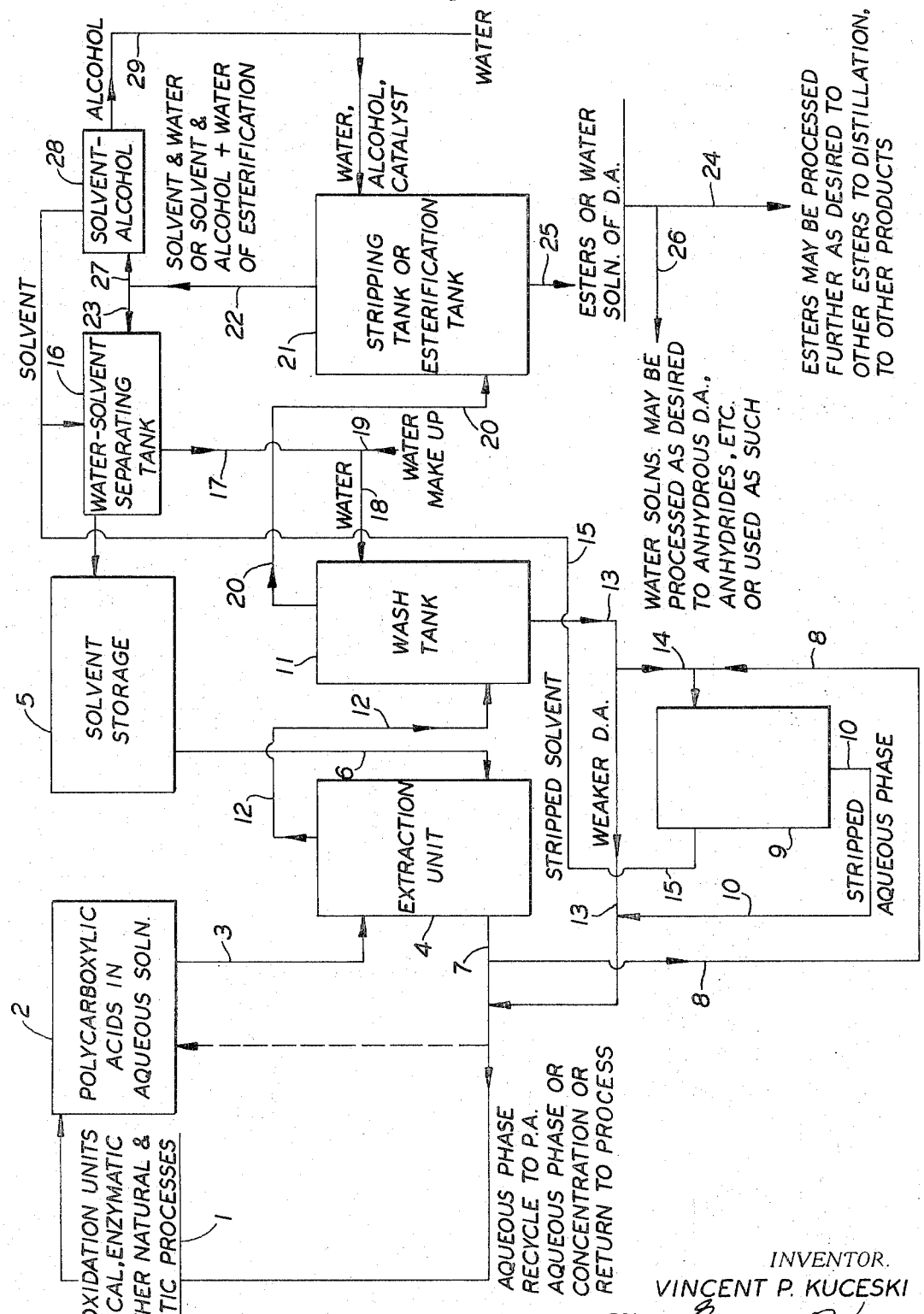

---

3,810,937
PURIFICATION OF CARBOXYLIC ACIDS
Vincent P. Kuceski, Chicago Heights, Ill., assignor to
The C. P. Hall Company, Stow, Ohio
Filed Sept. 15, 1970, Ser. No. 72,488
Int. Cl. C07c 55/02, 69/34
U.S. Cl. 260—485 R                                         23 Claims

ABSTRACT OF THE DISCLOSURE

Dicarboxylic acids in water solutions are purified and recovered by water-immiscible solvents. The solvent solutions of dicarboxylic acids are treated in various ways to recover, separate, and purify dicarboxylic acids. The aqueous phase remaining by extraction of dicarboxylic acids may be re-used by cycling back to the process in order to recover economic values of reactants and catalysts and to avoid buildup of polluting bleedstreams. Solvents and alcohols are recovered from aqueous and/or non-aqueous phases and are recycled in the process.

---

This invention relates to a method of recovering water-soluble dicarboxylic acids from aqueous solutions which also contain other water-soluble material, with removal of the acids from the aqueous solution and its purification.

The aqueous solution of the dicarboxylic acids may be derived from the oxidation of various organic source materials, including cyclohexane, cyclohexanol, cyclohexanone, naphthenes, etc. known as sources for adipic and other dicarboxylic acids, and carboxylic acids which result from biological, enzymatic and other chemical reactions or are by-products of such reactions.

If such aqueous solutions are evaporated to remove the water, the dicarboxylic acids present in them are contaminated with the other water-soluble substances. If all the water is evaporated and an attempt is made to distill the dicarboxylic acids remaining, often tarry residues are obtained and degradation occurs to such an extend that the distilled dicarboxylic acids are almost as badly contaminated with degradation products as they were originally.

One of the problems in recovering soluble dicarboxylic acids from aqueous solutions is that the soluble contaminants have many of the solution properties of the dicarboxylic acids. Therefore, when solvents are used in an attempt to recover the dicarboxylic acids, it is often found that the solvents which are good solvents for the dicarboxylic acids are also good solvents for the contaminants. On the other hand, if a solvent is used which is a poor solvent for the contaminants, it is also a poor solvent for the dicarboxylic acids. Furthermore, solvents which are polar enough to dissolve water-soluble dicarboxylic acids are very likely soluble in water thereby preventing easy phase separation after extraction.

This invention refers particularly to the extraction of aqueous solutions of dicarboxylic acids of the formula $C_nH_{2n} \cdot (COOH)_2$ in which $n=0$ to 8 including, for instance, oxalic, malonic, succinic, glutaric, itaconic, adipic, pimelic, suberic, azelaic and sebacic acids, etc.

In many cases such aqueous solutions are unusable as such and are frequently burned to get whatever heating value is present in the contaminating materials, or they may even be pumped to waste. Such burning or sewering adds to the pollution problem. Sometimes such wastes are pumped into holes in the ground, thus eventually contributing to pollution.

The present invention relates to the recovery of all or much of the acids, reducing or eliminating pollution.

The steps in the process include the following which may be carried out batchwise, continuously or intermittently with batchwise, continuous or intermittent recycling:

(1) Treating the aqueous stream containing dicarboxylic acids with insoluble solvent to extract dicarboxylic acids from the aqueous phase, separating the solvent phase from the aqueous phase and separately treating the two phases as follows:

(2) Solvent phase: (a) The separated solvent phase containing the dicarboxylic acid is stripped of solvent by volatilization leaving behind carboxylic acid which may be further processed. (The solvent phase may first be washed with a small amount of water to wash out contaminants without washing out too much of the dicarboxylic acids. Water from such a wash may be returned to any of several aqueous streams.) (b) The separated solvent phase may be treated with an alcohol and the dicarboxylic acids dissolved in the solvent esterified, using the solvent to help evaporate water of esterification, and then stripping the solvent from the esters. (The solvent phase containing esters may also be treated to purify the esters, as by alkali metal hydroxide and carbonate washing, water washing, and the like, before stripping off solvent.) (c) Step (a) above may be used except that instead of stripping off solvent to recover the dicarboxylic acids the solvent phase is contacted with water to remove the dicarboxylic acids as a water solution. (Alternatively, the solvent phase may be washed once with water to remove contaminants, and then extracted with further quantities of water to remove purified solutions of dicarboxylic acids which may be processed as desired.) The depleted solvent phase may then be re-used for extraction of new aqueous solutions without distillation.

(3) Aqueous phase: The aqueous phase, after contact with solvent, and now depleted of dicarboxylic acid, is stripped to remove dissolved solvent which is returned to the cycle for re-use. It can then be returned to the process after concentration if necessary. Often, this aqueous phase contains catalyst and reactive agents which are re-used in the process. If this phase comes from nitric acid oxidation of cyclohexanone-ol, the cyclohexanone-ol may be allowed to remain together with the nitric acid and catalysts which are contained by the bleedstream from such processes and all recycled to the oxidizing units of the process.

Thus, the solvent phase containing extracted dicarboxylic acids may be washed with water to remove any water-soluble impurities by batch, or continuous or intermittent methods, and the resulting solvent phase may be processed cyclically for re-use, either continuously, batchwise or intermittently; or the solvent phase may be stripped of the solvent by a batch, or continuous, or an intermittent process, with continuous, batch or intermittent recycling, thus yielding an anhydrous dicarboxylic acid for further processing as desired, with return of solvent to the process; or the solvent phase containing dicarboxylic acids may be subjected to esterification with alcohols (primary or secondary), or with glycols or with polyols, and then subjected to stripping to recover ester for re-use and/or recycling to the process. The esterification can be batch, continuous, intermittent or cyclic, with return of unused alcohol and solvent to the batch or continuous or intermittent or cyclic process. The solvent phase can be extracted with a polar solvent such as water. This yields a water solution which can be used as such or which may be further purified by sand bed, charcoal, clay, or ion-exchange treatments. Such water extraction can be done by a batch, continuous, intermittent or cyclic process.

According to this invention, 100 parts by weight of an aqueous solution which contains 2 to 35 parts by weight, and preferably 2 to 25 parts by weight, of dicarboxylic acids, such as obtained by nitric acid oxidation of cyclohexane, cyclohexanol, and/or cyclohexanone; or paraffins, fats and oils, fatty acids, etc., with or without catalyst of the type known to the art such as copper, vanadium, manganese, nickel, iron, chromium, molybdenum, mercury, boron, etc., or alloys or salts thereof, is extracted with solvent at ambient to reflux temperature, either in a batch or continuous or cyclic operation and preferably in an extracting column, continuously. After extraction of the acid, the extract is treated in various ways to recover the dicarboxylic acids for use. These and other useful treatments of the solvent and aqueous phases are described:

The following examples are illustrative:

EXAMPLE 1

One hundred (100) grams of an aqueous solution of mixed dicarboxylic acids, e.g., succinic, glutaric, adipic, etc., at various solid contents of dicarboxylic acids, were mixed vigorously with 60 ml. of cyclohexanone. The table below shows how the phases separate upon standing without agitation at ambient temperature:

| Weight aqueous phase (g.) | Aqueous phase, percent | Volume cyclohexanone, ml. | Phase separation |
|---|---|---|---|
| 100 | 35 | 60 | No separation after 3 days. |
| 100 | 32 | 60 | Very slow, 2 days. |
| 100 | 30 | 60 | Very slow. |
| 100 | 28 | 60 | Slow, several hours. |
| 100 | 25 | 60 | Fast and clear. |
| 100 | 17 | 60 | Do. |

When 100 grams of the 17-percent dicarboxylic acid (D.A.) solution was extracted, with 60 ml. of cyclohexanone once, the following results were obtained:

| | |
|---|---|
| Weight of aqueous phase _____ g__ | 100 |
| D.A. in aqueous phase before ext. _____ g__ | 17 |
| Volume cyclohexanone used _____ ml__ | 60 |
| D.A. found in cyclohexanone extract _____ g__ | 10.26 |

The cyclohexanone extract was washed with water to determine the loss by water extraction and also to determine the extent of water extraction.

| | G. |
|---|---|
| D.A. in cyclohexanone layer before extraction with 40 ml. water _____ | 10.25 |
| D.A. left in cyclohexanone after water wash _____ | 8.3 |

This experiment was done to show that a small water wash was feasible and would not extract too much of the dicarboxylic acids. Thus, impurities more soluble in water such as nitric acid, catalysts and salts can be removed, and this used wash water may be returned for use in the preparation of the aqueous dicarboxylic acid source material.

EXAMPLE 2

In this example 100 grams of 25 percent aqueous solution of D.A. was extracted in succession three times with 60 ml. cyclohexanone each time. The table below shows how much D.A. was extracted each time:

| | Weight of D.A. extracted, grams | Percent |
|---|---|---|
| First extract | 13.1 | 52 |
| Second extract | 7.6 | 30.5 |
| Third extract | 2.9 | 10.6 |
| Total | 23.6 | 93.1 |

Thus, it is shown that practically all the D.A. in the aqueous solution was extracted by the cyclohexanone.

The three extracts were esterified (after removal of solvent) with methanol and hydrochloric acid catalyst and the dimethyl esters were analyzed on a gas chromatograph. The gas chromatograph results showed that the cyclohexanone extracted succinic, glutaric, and adipic acid in proportions equivalent to those present in the original mixture of D.A. acids, i.e., 5 percent succinic, 5 percent adipic, and 15 percent glutaric.

EXAMPLE 3

In the following table we show results obtained using different solvents for extracting a solution of glutaric acid in nitric acid and water. The solution had the following composition:

| | Percent |
|---|---|
| Water | 72.8 |
| $HNO_3$ | 10.0 |
| Glutaric acid | 17.2 |

A solution of glutaric acid was used because it is easy to dissolve a larger amount in water than succinic or adipic acid and it shows the same type of solubility in water as succinic and adipic acids. Furthermore, it is easier to determine the amount present in the aqueous raffinate and the extract phases when a single acid is present.

In these tests 100 grams of the above solution was extracted with 50 ml. of fresh solvent twice. The two 50 ml. extracts were combined and evaporated to remove solvent, and were titrated to determine the amount of D.A. (glutaric acid) present. It was known that very little nitric acid was extracted by the solvent and therefore titration of the solvent solution with base gave a direct reading of the amount of D.A. extracted. The table below gives the results obtained with a wide variety of solvents:

| Solvent: | Percent D.A. extracted |
|---|---|
| Trimethylnonanone | 10.1 |
| Ucon® 11 | 0.0 |
| Ucon® 113 | 1.08 |
| Methyl benzyl ether | 0.0 |
| Isopropyl ether | 9.2 |
| Methylene chloride | 0.0 |
| Ethyl benzene | 6.5 |
| Toluene | 8.5 |
| Xylene | 8.5 |
| Benzene | 7.95 |
| Chlorothene® | 5.78 |
| Trichloroethylene | 9.4 |
| Methyl isoamyl ketone | 28.1 |
| Isophorone | 85.0 |
| Methyl isobutyl ketone | 37.2 |
| Methyl normal propyl ketone | 64.0 |
| Di-isobutyl ketone | 9.77 |
| Ethyl butyl ketone | 14.2 |
| N-butyl ether | 1.09 |
| Dichloroethyl ether | 0.0 |
| N-butyl chloride | 0.0 |
| Methylene bromide | 0.0 |
| N,N-dimethyl caproamide | 95.2 |
| N,N-dimethyl caprylamide | 90.5 |
| Cyclohexanone | 85.2 |
| N,N-dimethyl caproamide | 95.0 |
| N,N-dimethyl lauramide | 79.0 |
| N,N-dimethyl oleamide-linoleamide | 55.2 |
| N,N-dibutyl benzamide | 75.0 |
| N,N-diethyltoluamide | 89.0 |
| N,N-dibutyl-caproamide | 80.0 |
| N,N-dipropyl benzamide | 73.0 |
| N,N-dioctyl butyramide | 45.0 |
| N,N-dimethyl benzamide | (¹) |
| Hexane | 0.0 |

[1] Soluble in system.

The solvents which give efficient extraction are relatively few. The compounds which have electronegative oxygen groups, namely the ketones and amides, are extremely effective solvents. Less effective are the ethers, even less effective are some of the aromatic solvents. The halogenated solvents with the exception of trichloroethylene are poor solvents. The least effective are aliphatic solvents such as hexane.

Thus, the solvents are listed in order of effectiveness with the best at the top of the list.

Amides: N,N-dialkyl aliphatic amides, N,N-dialkyl aromatic amides
Ketones: Cyclic ketones, straight chain and branched ketones
Aromatics: Benzene, toluene, xylene, ethyl benzene
Ethers: Aliphatic ethers, aromatic-aliphatic ethers
Halogenated: Chloroethers
Aliphatics: Hexane, etc.

An amide or ketone is usually employed, and sometimes an aromatic, but any of the solvents may be used on occasion.

The process is further explained by referring to the drawings which is a schematic drawing showing the equipment and flow of materials which may be used in a variety of continuous cyclic processes.

The dicarboxylic acid or a mixture thereof is supplied from source 1 and is pumped to holding tank 2, which can also be used to concentrate or dilute. Then by line 3 it is sent to the top of the extraction unit or tower 4 where it is allowed to contact the water-immiscible solvent by continuous countercurrent flow from tank 5 by line 6. The aqueous phase, now depleted of carboxylic acid may be recycled back to the process by line 7. Before it is recycled either (a) it may be concentrated and pumped back to tank 2 from which it is again subjected to extraction in 4, or (b) it may be sent by line 8 to stripping tower 9 to remove solvent before sending it back to the process by line 10. If the aqueous solution was bleed stream from the nitric acid process for making adipic acid, it would not have to be stripped to remove a solvent such as cyclohexanone because this solvent may be used as a raw material in the oxidation to adipic acid. The solvent solution containing dicarboxylic acid is now sent to the wash tank 11 by line 12 where a water wash can be used, if desired, to remove some remaining impurities such as inorganic acids, salts, and catalysts. The wash water which contains some dicarboxylic acids and catalysts is sent by line 13 back to the process or sent by line 14 to a solvent stripping tower 9 where solvent is removed by line 15 and sent to the water solvent separation tank 16. The wash water is sent by lines 14 and 8 back to the process. Water from tank 16 may be sent to wash tank 11 by line 17, 18 with make-up water by line 19 and 18.

The solvent layer from wash tank 11 is sent by line 20 to the stripping tank 21 where the solvent may be stripped off along with some water and sent to water-solvent separating tank 16 by line 22 and 23, where the solvent separated is sent to storage tank 5. Alcohol may be added for esterification before solvent is stripped in 21 or may be added after all or most of the water is removed or may be added after all of the solvent is removed to effect esterification. The esters may then be washed with water or they may be distilled or otherwise processed in unit 24.

Alternatively, the solvent solution of dicarboxylic acids in 21 may be washed with water to remove the dicarboxylic acids as a water solution. The water solution may thus be stripped of solvent after removal by line 25 in unit 26 and the solvent sent to tank 16. (No pipe line given.) The water solution may be concentrated to anhydrous dicarboxylic acids and the carboxylic acids obtained processed further.

If alcohol is used to effect esterification in 21, excess alcohol is stripped and recycled by line 22 to 27 to solvent alcohol tank 28 and back to 21 by line 29.

It is, of course, obvious that when a solvent with a higher specific gravity than the aqueous solution is used, the paths of the solvent and aqueous phases will be reversed in the units where phase separation takes place.

EXAMPLE 4

A mixture was prepared as follows:

|  | Percent |
|---|---|
| Succinic acid | 10 |
| Nitric acid | 7 |
| Water | 83 |

One hundred (100) grams of the above solution were extracted once with 50 ml. of cyclohexanone at room temperature. The separation of the layers was fast and sharp. Upon evaporation of the solvent layer, 3.5 grams of succinic acid was recovered or 35% with one pass of solvent equal to one-half volume of the aqueous phase. A nitric acid determination showed that only 0.5% of nitric acid remained in the cyclohexanone layer. This shows that cyclohexanone prefers to extract succinic acid without extracting nitric acid.

When a mixture such as above containing 20% succinic acid instead of 10% succinic acid was used, a precipitate of succinic acid seemed to appear at the cyclohexanone interface when 50 ml. was used to extract as before. 5.8 grams of succinic acid was extracted indicating a 29% efficiency. The $HNO_3$ extracted was still only 0.5% showing that more succinic could be extracted without increasing the amount of nitric acid extracted.

EXAMPLE 5

One hundred (100) grams of a 25% essential dicarboxylic acid aqueous solution having the following composition:

|  | Percent |
|---|---|
| Succinic acid | 4.6 |
| Glutaric acid | 11.9 |
| Adipic acid | 4.6 |
| $HNO_3$ | 7.6 |
| Valeric acid | 3.8 |
| Catalyst Cu-Va salts | 0.7 |
| Water | 66.8 |
|  | 100.0 | was extracted three (3) times at room temperature with 50 ml. of cyclohexanone each time. The extracts were combined and the solvent solution washed once with 40 ml. of water. The solvent solution became lighter in color. Upon evaporation of the solvent, a residue weighing 21.42 grams was left with the following composition:

|  | Percent |
|---|---|
| Succinic | 14.8 |
| Glutaric | 46.9 |
| Adipic | 17.15 |
| Valeric | 16.6 |
| Cyclohexanone | 4.5 |
| $HNO_3$ | 0.03 |
| Cu-Va salts | 0.02 |

Thus, the procedure gave a yield of approximately 80% after subtracting solvent and the product dicarboxylic acids were free of nitric acid and catalyst salts.

The aqueous phase, now depleted of a large proportion of its dicarboxylic acids, but retaining practically all of the nitric acid and catalyst, can be re-used in the process of producing adipic acid from air and nitric acid oxidation of cyclohexane-cyclohexanol-cyclohexanone.

EXAMPLE 6

In this example, the procedure of Example 5 was used to extract the dicarboxylic acids and wash the solvent phase, but instead of evaporating the solvent phase, excess octyl alcohol was added to the solvent phase together with catalyst to effect esterification of the dicarboxylic acids present in the solvent phase. Thus, esters suitable for plasticizer use were prepared and consisted of the following esters:

Dioctyl succinate  Dioctyl glutarate
Dioctyl adipate  Dioctyl valerate

A nearly theoretical yield was obtained. The solvent and the excess alcohol can then be removed by distillation and re-used in the process.

EXAMPLE 7

In this experiment, the procedure for Example 5 was used to extract the dicarboxylic acids from the aqueous solution followed by washing of the solvent layer to remove impurities. But after the small wash of 40 ml. of water was used, several washes were put on the solvent layer to remove 90% of the dicarboxylic acids present. The water washes, now containing the purified carboxylic acids may be used as such as a dilute solution of dicarboxylic acids or it may be concentrated, made anhydrous, or distilled, or further processed to esters, amides, polyesters, etc.

EXAMPLE 8

One hundred (100) grams of a 4.6% aqueous solution of pimelic acid was extracted twice with 50 ml. of cyclohexanone. The cyclohexanone layers were combined and amounted to 85.2 grams which upon titration with KOH revealed that 96.7% of the pimelic acid was extracted from the aqueous solution.

When benzene was used in place of cyclohexanone, only 3% of the pimelic acid was extracted.

When cyclohexane was used, there was 0.0% extracted.

EXAMPLE 9

When a fatty acid such as oleic and/or stearic acid is oxidized according to the procedure given in U.S. Pat. 2,824,122, a mother liquor in an aqueous solution is obtained having the following composition:

|  | Percent |
|---|---|
| Succinic | 22.93 |
| Glutaric | 23.90 |
| Adipic | 16.82 |
| Pimelic | 22.75 |
| Suberic | 4.71 |
| Azelaic | 5.73 |
| Sebacic | 0.08 |
| Monocarboxylic acid | 3.08 |
|  | 100.00 |

This solution is diluted to 25% solids containing 5% $HNO_3$ and is extracted three (3) times with an equal volume of isophorone to yield a solvent extract containing 95% of the total acids originally present.

When toluene is used, only 40% was extracted and the acids extracted contained almost all of the mono-carboxylic acids from $C_5$ to $C_{18}$ and sebacic, azelaic, suberic, and pimelic acids. About one-half of the succinic, glutaric, and adipic acids were also extracted.

A wash of the solvent phase removed only a small amount of the higher molecular weight acids and succeeded in reducing the nitric acid concentration down to 0.1%.

EXAMPLE 10

In this example we wished to determine specifically what happens when an extremely water-loving dicarboxylic acid is dissolved with a copper catalyst in a nitric acid solution and then subjected to extraction with cyclohexanone. We wished to determine if the copper catalyst as nitrate-sulfate salts stayed with the nitric acid aqueous solution or if the cyclohexanone would selectively extract the extremely water-soluble glutaric acid without removing much of the catalyst salt.

A solution was made up of the following:

|  | Percent |
|---|---|
| Glutaric acid | 17.2 |
| $HNO_3$ | 10.0 |
| $CuSO_4 5H_2O$ | 2.0 |
| Water | 71.0 |

One hundred (100) grams of the above mixture was extracted three (3) times with 50 ml. of cyclohexanone and analysis showed that 85% of the glutaric acid originally present was extracted. No wash was used on the aqueous phase since we wanted to know what the efficiency was without a wash.

Analysis of the cyclohexanone layer showed only 0.3% of total nitric acid was present in this layer.

Upon ashing the glutaric acid remaining after solvent was removed by evaporation, there was found only 0.002 gram of $CuSO_4 5H_2O$ in a sample of glutaric acid weighing 0.66 gram. Thus, only .3% Cu salt was detected, when the original amount present was 2 grams in 17.2 grams of glutaric acid or about 11.6%. Percentagewise, the amount of copper salt removed from the sample was 11.3/11.6 or 97.5%.

When a wash is used to further purify the carboxylic acid in solvent solution, a slight loss in yield is experienced of about 20%, but the resulting carboxylic acids are almost entirely free of contaminating nitric acid and catalyst salts. Thus in an experiment the same as the one above with the exception that two washes of 20 ml. of water were put on the solvent phase, a glutaric acid product was obtained containing only 0.01% Cu as the sulfatenitrate and only 0.03% as nitric acid.

Obtaining a product such as glutaric acid from a catalytic nitric acid process so free of contaminants is truly remarkable since this is almost imposible to do by steam stripping or distillation without appreciable to substantial degradation.

I claim:

1. The process of treating water soluble dicarboxylic acids of the formula $C_nH_{2n} \cdot (COOH)_2$ in which $n=0$ to 8, in an aqueous solution thereof containing impurities and purifying the dicarboxylic acids, which process comprises extracting the dicarboxylic acids from a 2 to 35 percent aqueous solution thereof with water-immiscible solvent which contains an electro-negative group and is from the class consisting of aliphatic and aromatic ketones and dialkyl amides.

2. The process of claim 1 in which solvent used is also source material in the production of carboxylic acids and is re-used in the process.

3. The process of claim 1 in which the solvent is cyclohexanone.

4. The process of claim 1 in which the solvent is a cyclic ketone having 6 to 9 carbon atoms.

5. The process of claim 1 in which the solvent belongs to the class of methyl, ethyl, and butyl ketones having from 5 to 15 carbon atoms.

6. The process of claim 1 in which the solvent is from the class consisting of N,N-dialkyl benzamide and toluamide.

7. The process of claim 1 in which the solvent is N,N-dialkyl amides of the fatty acid series having 4 to 18 carbon atoms.

8. The process of producing esters of water soluble carboxylic acids which process comprises extracting acids of the formula $C_nH_{2n} \cdot (COOH)_2$ in which $n=0$ to 8, from an aqueous solution with a water immiscible solvent which contains an electronegative group and is from the class consisting of aliphatic and aromatic ketones and dialkylamides, separating the non-aqueous phase and adding alcohol to it with catalyst as required, effecting esterification, then removing solvent from the esters, leaving purified esters as a residue.

9. The process of claim 8 in which the alcohol is methyl alcohol and the esters are distilled after removal of solvent.

10. The process of claim 8 in which the esters, before or after removal of solvent, are washed with water solution of alkali metal hydroxide or carbonate to further purify the esters.

11. The process of claim 1 which includes removing solvent from the extract and leaving the water-soluble dicarboxylic acids.

12. The process of claim 1 in which the dicarboxylic acids are obtained by the nitric acid oxidation of a material of the class consisting of paraffins, fats, oils and fatty acids.

13. The process of claim 1 in which the dicarboxylic acids are obtained by the nitric acid oxidation of a material of the class consisting of cyclohexane, cyclohexanol and cyclohexanone.

14. The process of claim 12 in which the aqueous solution after extraction of the dicarboxylic acids contains catalyst of the class consisting of copper, vanadium, manganese, nickel, iron, chromium, molybdenum, mercury, boron and alloys and salts thereof, and said solution is recycled to the oxidation step.

15. The process of claim 13 in which the aqueous solution after extraction of the dicarboxylic acids contains catalyst of the class consisting of copper, vanadium, manganese, nickel, iron, chromium, molybdenum, mercury, boron and alloys and salts thereof, and said solution is recycled to the oxidation step.

16. The process of claim 13 in which cyclohexanone is used as the solvent.

17. The process of claim 1 in which the aqueous solution containing the dicarboxylic acids is obtained by oxidation of organic source material, and the aqueous solution from which dicarboxylic acid has been extracted is recycled to the oxidation of the organic source material.

18. The process of claim 17 in which the aqueous solution from which dicarboxylic acid has been extracted is concentrated before return to the oxidation of the organic source material.

19. The process of claim 17 in which the organic source material includes cyclohexanone or cyclohexanol and is oxidized by nitric acid and at least some of said cyclohexanone or cyclohexanol is retained in the aqueous solution which is returned to the oxidation of the source material.

20. The process of separating dicarboxylic acids from a solution of water-soluble dicarboxylic acids which process comprises:
(a) Oxidizing organic source material with nitric acid using a metal-containing oxidation catalyst,
(b) Extracting dicarboxylic acids from an aqueous solution of the oxidized source material, with an immiscible electronegative solvent of the class consisting of aliphatic and aromatic ketones and alkyl amides and forming a solvent layer and an aqueous layer,
(c) Separating the solvent layer from the aqueous layer,
(d) Recovering dicarboxylic acids from the solvent layer, and
(e) Recycling nitric acid and metal-containing oxidation catalyst in the aqueous layer to the oxidation step.

21. The process of claim 20 in which the aqueous layer is concentrated by distillation and the distillate is recycled to the solvent extraction step.

22. The process of separating dicarboxylic acids from the aqueous bleed stream from the nitric-acid oxidation of cyclohexane, cyclohexanol and/or cyclohexanone, the bleed stream being an aqueous solution containing nitric acid, metal-containing oxidation catalyst and 2 to 35 percent of dicarboxylic acid which process comprises:
(a) Extracting with immiscible solvent dicarboxylic acid from the aqueous bleed stream or an aqueous derivative thereof,
(b) Separating the solvent and aqueous layers,
(c) Distilling solvent from the solvent layer and recovering a residue composed essentially of dicarboxylic acid, and
(d) Recycling the remaining aqueous layer containing nitric acid and metal-containing oxidation catalyst to the oxidation step.

23. The process of claim 22 in which the bleed stream is concentrated by distillation after its extraction, and the distillate is recycled to solvent for the extraction step.

References Cited
UNITED STATES PATENTS

| | | | |
|---|---|---|---|
| 2,714,118 | 7/1955 | Copenhaver et al. | 260—527 |
| 2,824,122 | 2/1958 | Kuceski | 260—533 |
| 3,040,094 | 6/1962 | Stine et al. | 260—527 |
| 3,433,830 | 3/1969 | Wilkes | 260—514 |

FOREIGN PATENTS

| | | | |
|---|---|---|---|
| 1,270,883 | 7/1961 | France | 260—537 |

OTHER REFERENCES

Montgomery et al.: Ind. & Eng. Chem., vol. 45 (1953), pp. 1138–1143.

Regna et al.: Ind. & Eng. Chem., vol. 48 (1956), pp. 1268–1276.

JAMES A. PATTEN, Primary Examiner

U.S. Cl. X.R.

260—527 R, 533 C, 537 R, 538

UNITED STATES PATENT OFFICE
CERTIFICATE OF CORRECTION

Patent No. 3,810,937      Dated May 14, 1974

Inventor(s) V. P. Kuceski

It is certified that error appears in the above-identified patent and that said Letters Patent are hereby corrected as shown below:

Col. 1, line 38, change "extend" to -- extent --

Col. 6, line 29, change "essential" to -- essentially --

Claim 5, lines 2-3, cancel "having from 5 to 15 carbon atoms"

Signed and sealed this 10th day of September 1974.

(SEAL)
Attest:

McCOY M. GIBSON, JR.
Attesting Officer

C. MARSHALL DANN
Commissioner of Patents